United States Patent
Utaki

(10) Patent No.: US 6,941,974 B2
(45) Date of Patent: Sep. 13, 2005

(54) CABLE OR THE LIKE PROTECTION AND GUIDE DEVICE

(75) Inventor: Akihiko Utaki, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/899,621

(22) Filed: Jul. 27, 2004

(65) Prior Publication Data

US 2005/0056333 A1 Mar. 17, 2005

(30) Foreign Application Priority Data

Sep. 11, 2003 (JP) ........................................ 2003-320322

(51) Int. Cl.$^7$ ............................................. F16L 11/00
(52) U.S. Cl. ........................ 138/120; 138/110; 138/155
(58) Field of Search ................................ 138/120, 110, 138/119, 155

(56) References Cited

U.S. PATENT DOCUMENTS

| | | | | |
|---|---|---|---|---|
| 421,781 A | * | 2/1890 | Stoughton | 174/111 |
| 2,975,785 A | * | 3/1961 | Sheldon | 600/141 |
| 3,096,962 A | * | 7/1963 | Meijs | 248/276.1 |
| 3,190,286 A | * | 6/1965 | Stokes | 600/141 |
| 3,330,105 A | * | 7/1967 | Weber | 59/78.1 |
| 4,068,088 A | * | 1/1978 | Smith | 174/136 |
| 4,108,211 A | * | 8/1978 | Tanaka | 138/120 |
| 4,392,344 A | * | 7/1983 | Gordon et al. | 59/78.1 |
| 4,432,349 A | * | 2/1984 | Oshiro | 600/141 |
| 4,702,281 A | * | 10/1987 | Moritz | 138/120 |
| 4,790,294 A | * | 12/1988 | Allred et al. | 600/141 |
| 4,972,048 A | * | 11/1990 | Martin | 174/136 |
| 5,271,382 A | * | 12/1993 | Chikama | 600/142 |

FOREIGN PATENT DOCUMENTS

| | | |
|---|---|---|
| JP | HEI-6-11740 | 3/1994 |
| JP | HEI-8-47153 | 2/1996 |
| JP | HEI-9-177902 | 7/1997 |

* cited by examiner

Primary Examiner—James Hook
(74) Attorney, Agent, or Firm—Woodling, Krost and Rust

(57) ABSTRACT

To provide a cable or the like protection and guide device excellent in endurance and reliability by preventing breakage of a flexible cable-shaped body (cable, rope, wire or the like). A cable or the like protection and guide device of the invention includes link frame members (10) each having a rectangular section, and a pair of flexible cable-shaped members (20) insertion-passing through the respective guide holes (15) formed on both side walls of the link member. A cable or the like is inserted into the link frame members to be protected and guided in a state where a number of the link frame members are articulately connected to each other by the flexible cable-shaped members. The guide hole (15) through which the flexible cable-shaped member is insertion-passed is formed of an arc surface (15b) concentric with an arc formed of mutually bent said link frame members.

2 Claims, 4 Drawing Sheets

US 6,941,974 B2

CABLE OR THE LIKE PROTECTION AND GUIDE DEVICE

This application claims priority to Japanese Patent Application 2003-320322 filed Sep. 11, 2003.

TECHNICAL FIELD

This invention relates to a cable or the like protection and guide device, and more specifically relates to a cable or the like protection and guide device through which a cable or the like such as a cable, hose or the like, which supplies energy such as electric power, compressed air or the like to a movable section of an industrial machine, is inserted.

BACKGROUND TECHNOLOGY

Such a conventional cable or the like protection and guide device has a structure in which a plurality of units are connected to each other with wires. The cable or the like is inserted into the units. Each unit comprises a member having a rectangular section including a body having a channel-shaped section comprising a pair of side plates and a connecting plate, which connects lower ends of the side plates, and a lid hinge-connected to an upper end of the side plate. The wire is insertion-passed through a through hole in the side plate. The side plate of each unit is formed in a rectangle on a bending outer peripheral side and in a trapezoid on a bending inner peripheral side when viewed from a side. When the respective units are in a linear mode, vertical pieces forming front and rear edges of bending outer peripheral side portions of the side plates make contact with each other and as the respective units become in a bending mode, they are obliquely moved so that oblique sides forming front and rear edges of bending inner peripheral side portions make contact with each other (see for example Patent Reference 1).

In another cable or the like protection and guide device, a number of link chains are adjacently disposed and a rope member passes through a rope passage, which penetrates the respective chain links. Each of the link chains has a H-shaped section and is formed so that the bending outer peripheral side of a side wall is rectangular and the bending inner peripheral side of the side wall is trapezoidal when viewed from the side. When the respective link chains are in a linear mode, side end edges of vertical pieces forming the front and rear edges of bending outer peripheral side portions make contact with those of adjacent link frame members and as the respective link chains become in a bending mode, they are obliquely moved about a link disk disposed between link chains so that the side end edges of oblique sides forming bending inner peripheral side portions make contact with those of the link frame members (see for example Patent Reference 2).

In still another cable or the like protection and guide device, a chain unit member comprises members of rectangular sections including opposed pair of side plates with a space, a supporting plate, which connects lower portions of the side plates and a closing member removably attached to an upper portion of the side plate. The respective chain unit members are adjacently disposed, and connected by belt-shaped elastic connecting members inserted into inner spaces each formed of side plates, a supporting plate and a closing member. Side wall portions of the respective chain unit members are trapezoidal. When the respective chain unit members are in a linear mode, front and rear edges of side wall portions make contact with each other. As they become in a bending mode, bending inner peripheral side corners of the side wall portions make contact with each other (see for example Patent Reference 3).

Patent Reference 1: Publication of Japanese Utility Model No. Hei-6-11740.
Patent Reference 2: Publication of Japanese Laid-open Patent No. Hei-8-47153.
Patent Reference 3: Publication of Japanese Laid-open Patent No. Hei-9-177902

PROBLEMS TO BE SOLVED BY THE INVENTION

In these cable or the like protection and guide devices, when the respective units, chain links or chain unit members are bent, a bending inner peripheral side surface, which makes contact with a wire, a rope or a belt in a rope passage or a supporting plate forms a side in a polygon in each case. Thus, since the wire, rope or belt is deformed repeatedly in a polygon, it is liable to be broken from a corner thereof. Particularly, when it is incorporated into an apparatus, a flexible cable member or the like is liable to be broken for a short period of time.

The object of the present invention is to provide a cable or the like protection and guide device excellent in endurance and reliability by preventing breakage of a flexible cable-shaped member (cable, rope, wire or the like).

MEANS FOR SOLVING THE PROBLEMS

To attain the above-mentioned object, a cable or the like protection and guide device according to claim 1, including link frame members each having a rectangular section, and a pair of flexible cable-shaped members insertion-passing through the respective guide holes formed on both side walls of said link member wherein a cable or the like is inserted into said link frame members to be protected and guided in a state where a number of said link frame members are articulately connected to each other by said flexible cable-shaped members is characterized in that the guide hole through which said flexible cable-shaped member is insertion-passed is formed of an arc surface concentric with an arc formed of mutually bent said link frame members.

Further, in the cable or the like protection and guide device according to claim 1, the invention according to claim 2 is characterized in that each of bent connecting surfaces of said link frame members is formed on a curved surface consisting of an involute curve.

EFFECTS OF THE INVENTION

According to the invention of claim 1, in a cable or the like protection and guide device according to claim 1, including a link frame member having a rectangular section, and a pair of flexible rope members insertion-passing through the respective guide holes formed on both side walls of said link member wherein a cable or the like is inserted into said link frame members to be protected and guided in a state where a number of said link frame members are articulately connected to each other by said flexible rope members, the guide hole through which said flexible rope member is insertion-passed is formed of an arc surface concentric with an arc formed of mutually bent said link frame members. Thus, when the link frame members are bent, one arc surface, which has the center in common with the bending center of the link frame members, is formed in guide holes of bent link frame members. Thus, a portion of a flexible cable-shaped member, which passes through bent link frame members, is smoothly bent along this arc surface, whereby the breakage of the flexible cable-shaped member can be minimized. Accordingly, even if operation is made at high speed and with high frequency, a cable or the like protection and guide device having high endurance and reliability and having no breakage of a flexible-shaped member at all, can be obtained.

Further, in addition to the effect, which the invention of claim 1 exerts, a cable or the like protection and guide device according to claim 2 has a configuration that each of bent connecting surfaces of said link frame members is formed of a curved surface consisting of an involute curve. Thus, a length $\pi R$ of a radius of a flexible cable-shaped member in link frame members in a bent mode is not changed and the length of the flexible cable-shaped member always becomes fixed. Accordingly, the tension of the flexible cable-shaped member is not increased, resulting in no breakage of the flexible cable-shaped member. Therefore, even if this device is incorporated into an apparatus, which is operated at high speed and with high frequency, a flexible cable-shaped member is not broken and a cable or the like protection and guide device having higher reliability and endurance can be obtained.

Figure 1:
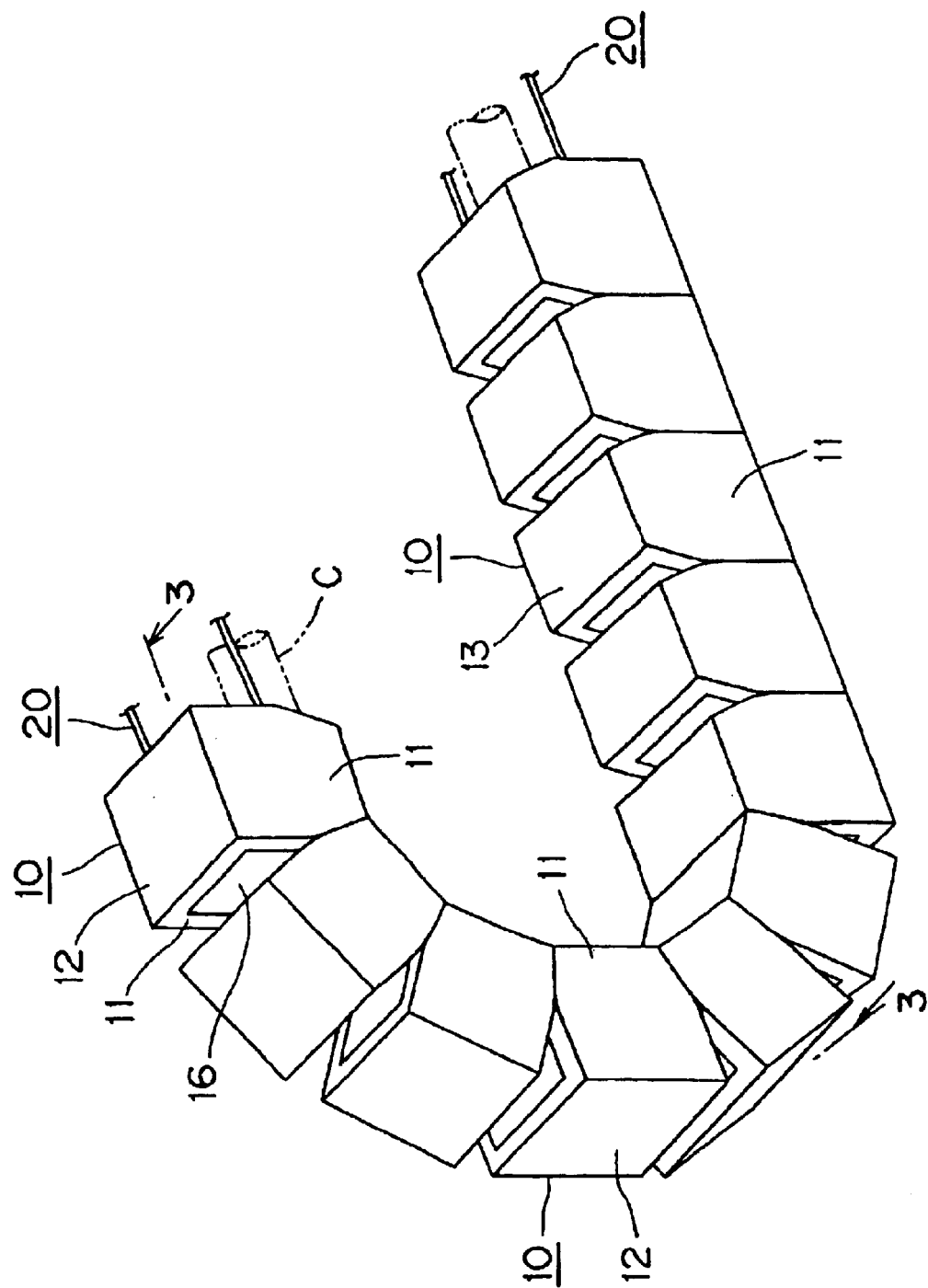
FIG. 1 is a perspective view of one example of a cable or the like protection and guide device of the present invention.

A better understanding of the drawing will be had when reference is made to the DESCRIPTION OF THE INVENTION and CLAIMS which follow hereinbelow.

DESCRIPTION OF THE INVENTION

An example used as an embodiment of a cable or the like protection and guide device will be described with reference to drawings.

This cable or the like protection and guide device is a type in which a cable or the like is accommodated in an enclosed manner, and as shown in FIG. 1 it includes a number of link frame members 10. These link frame members 10 are arranged in one row and articulately connected to each other by extendable flexible cable-shaped members 20.

Figure 2:
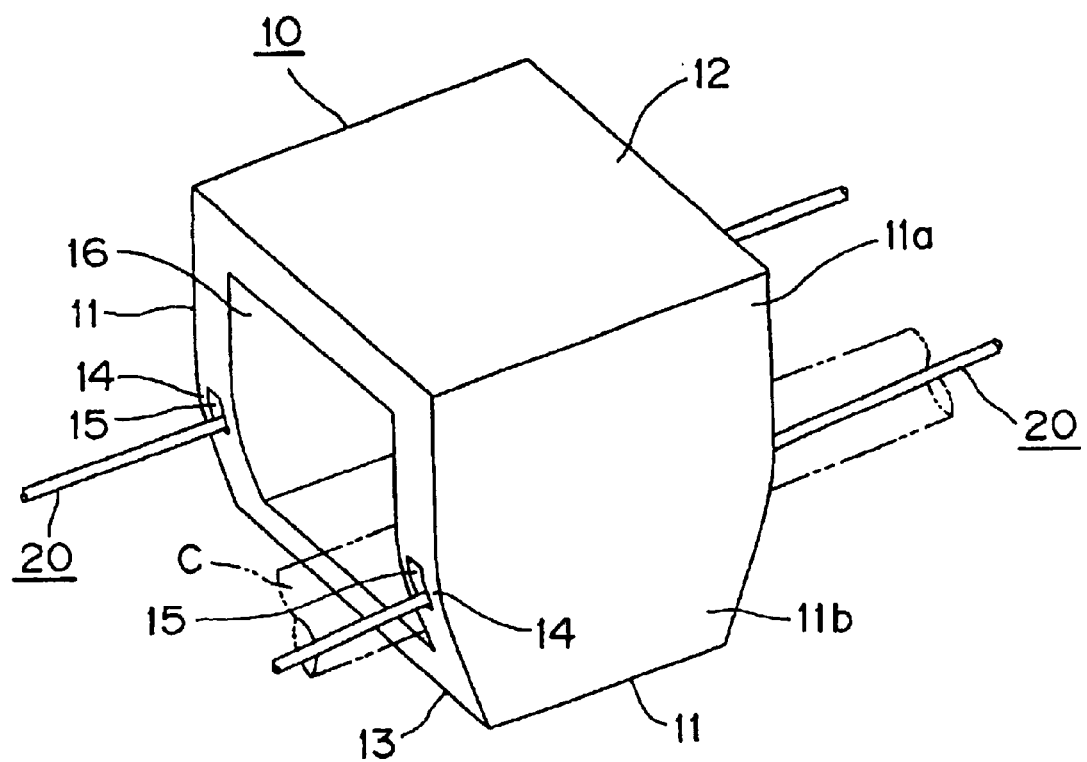
FIG. 2 is an enlarged perspective view of a link frame member forming the cable or the like protection and guide device shown in FIG. 1.

FIG. 2 shows a detail of a link frame member 10. The link frame member 10 is composed of a conductive plastic for example and comprises a pair of side plates 11, an outer peripheral side connecting plate 12, which constructs a bridge over bending outer peripheral sides of the side plates 11 and an inner peripheral side connecting plate 13, which constructs a bridge over bending inner peripheral sides of the side plates 11. Thus, the link frame member 10 is formed in a form of a square tube having a rectangular section in the outline.

The side plate 11 has a bending outer peripheral side portion 11a and a bending inner peripheral side portion 11b. The bending outer peripheral side portion 11a is rectangular when viewed from a side. Front and rear edges of the bending inner peripheral side portions 11b in each link frame member 10, facing the adjacent link frame members 10, pass through the center O in the bending radius of the link frame member 10 in their extensions, as shown in FIG. 3.

Figure 4:
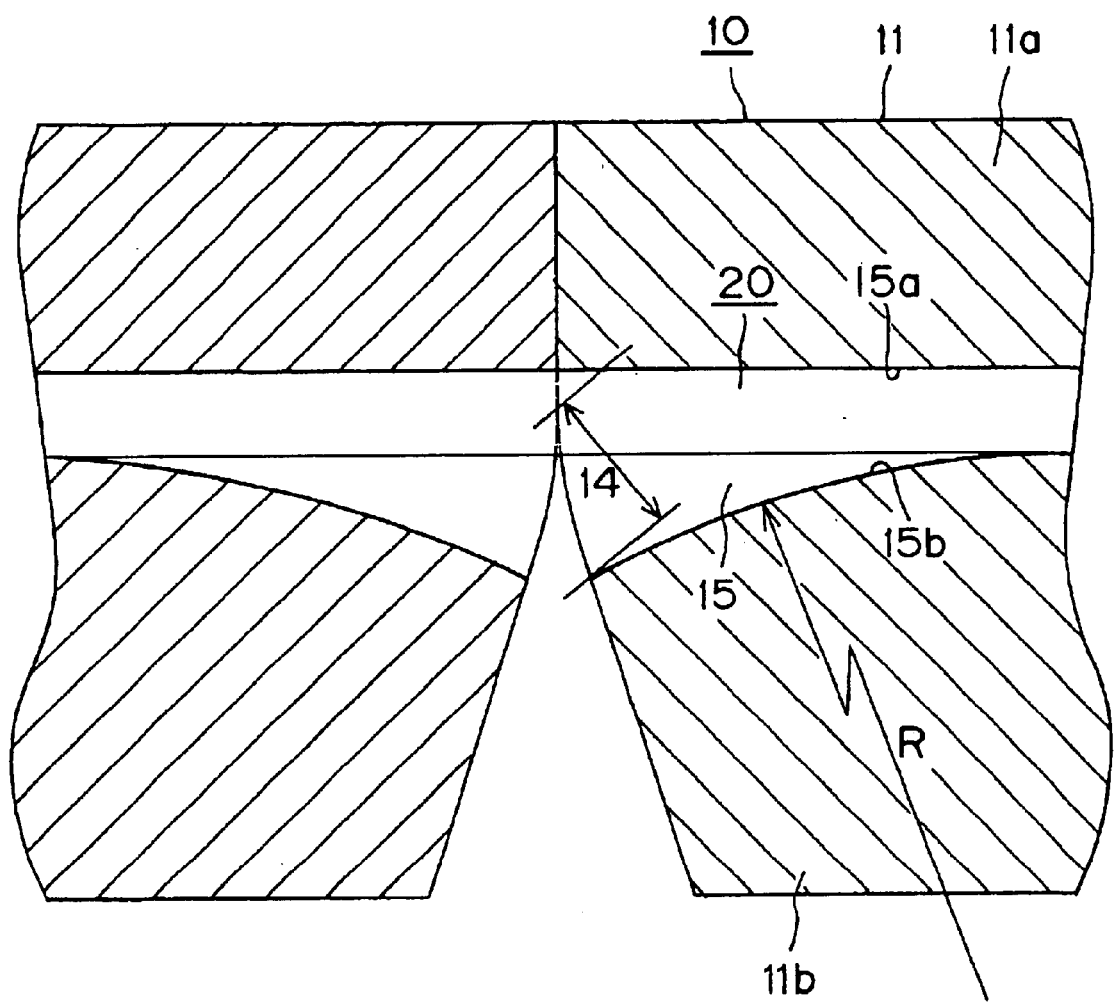
FIG. 4 is an enlarged cross-sectional view of a partial link frame member in FIG. 3.

Therefore, the bending inner peripheral side portion 11b is in a trapezoidal shape when viewed from a side. And as shown in FIG. 4, regions 14 positioned between a bending outer peripheral side portion 11a and a bending inner peripheral side portion 11b in front and rear edges of each link frame member 10 become bent contact surfaces, which make contact with the front and rear edges of adjacent link frame members 10 when the link frame members 10 are bent as described later, and each bent contact surface 14 is formed of a curved surface of an involute curve.

A guide hole 15 is provided in the vicinity of the bending contact surface 14 in each side plate 11. The guide hole 15 penetrates a side plate 11. The cable-shaped member 20 is inserted through such guide holes 15. The cable-shaped member 20 itself is composed of an extendable flexible member, a plastic or metallic wire or rope, a plastic belt or the like. In this example the cable-shaped member 20 is composed of a plastic wire. Both ends of this cable-shaped member 20 penetrating the link frame member 10 are connected to retainers so as to apply tension to the cable-shaped member 20. Although not shown, retainers are connected to link frame members 10 positioned on the both ends.

Figure 3:
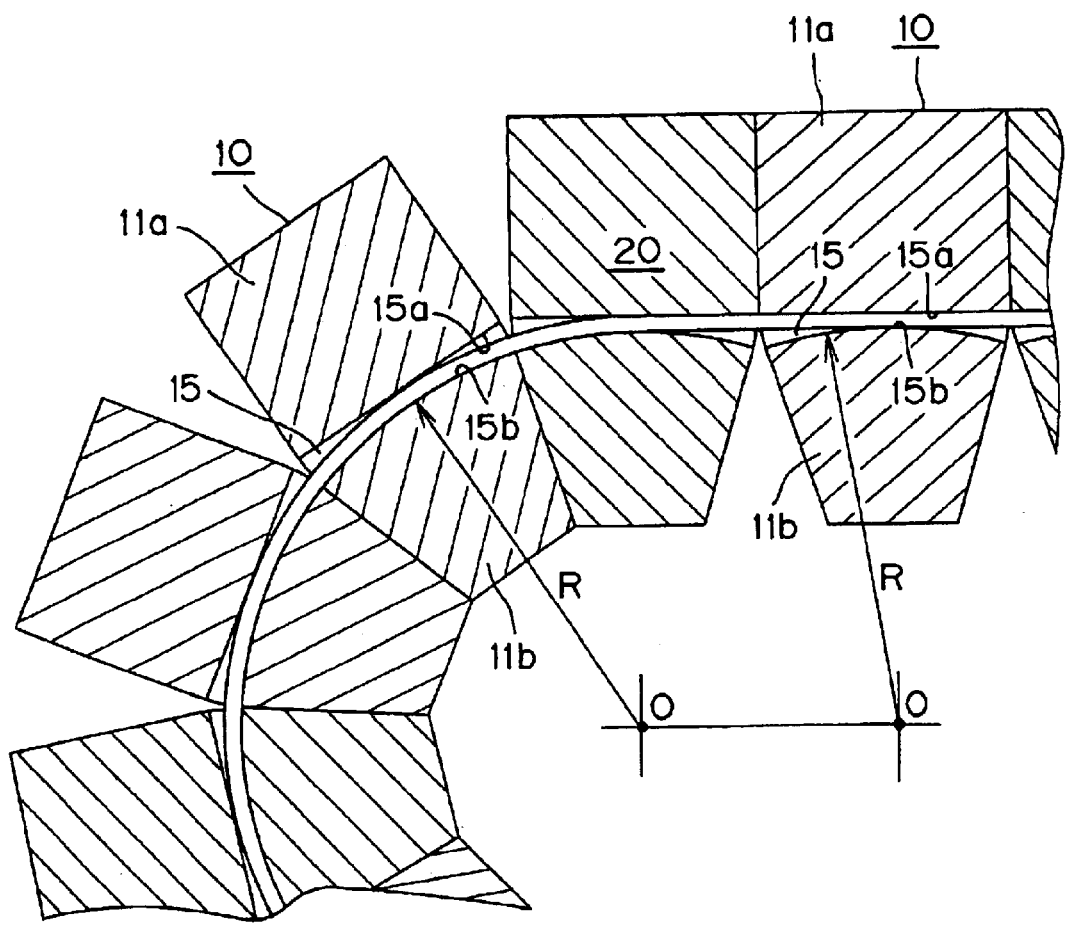
FIG. 3 is a cross-sectional view taken along the line 3—3 in FIG. 1.

As shown in FIG. 3, each of the guide holes 15 is composed of a rectangular-section square hole formed of four surfaces of a bending outer peripheral side inner surface 15a, a bending inner peripheral side inner surface 15b and side inner surfaces positioned on the front and rear sides. The bending outer peripheral side inner surface 15a and the side inner surfaces consist of flat surfaces. However, the bending inner peripheral side inner surface 15b consists of a curved surface. This bending inner peripheral side inner surface 15b has an arc surface concentric with the arc formed by bending of the link frame members 10 mutually, and in other words it has an arc surface of a radius R having a center in common with the bending center O of the link frame members.

The cable-shaped member 20 makes contact with the top of the bending inner peripheral side inner surface 15b in a link frame member in a linear mode. On the other hand, in a link frame member 10 in a bending mode, the entire flexible cable-shaped member makes into contact with the bending inner peripheral side inner surface 15b since the bending inner peripheral side inner surface 15b forms an arc surface having the bending center O.

The cable or the like protection and guide device is used for protecting a cable or the like such as a cable, a pipe or the like, which connects an apparatus on a movable section to an apparatus on a stationary section in an industrial machine having the movable section and the stationary section. For example, the cable or the like protection and guide device is used for protecting and guiding a power cable, which connects a motor on a movable section to a power system on a stationary section in a machine tool. The incorporation of the cable or the like protection and guide device is performed by inserting a cable or the like C in a cable or the like accommodating space formed of inner spaces 16 of the respective link frame members 10, electrically connecting one end of the cable or the like C to a spindle driving motor on a movable section in a machine tool and the other end thereof to a power supply system on the stationary section, and connecting ends of the link frame members 10 to the movable section and the stationary section respectively.

When the movable section of a machine tool is moved, the link frame member 10 becomes in a bending mode or in a linear mode, and at the same time a cable or the like C is moved together with the link frame members 10 while being protected and guided by the link frame members 10.

Then, the linear mode of a link frame member 10 is maintained by contacting the front and rear edges of the bending outer peripheral side portion 11a with the respective rear and front edges of the adjacent link frame members 10. On the other hand, the bending mode of a link frame member 10 is maintained by contacting the front and rear edges of the bending inner peripheral side portion 11b with the respective rear and front edges of the adjacent link frame members 10 to limit a bending angle. Further, the flexible cable-shaped member 20 makes contact with the top of a bending inner peripheral side inner surface 15b in a link frame member 10 in the linear mode. On the other hand, the flexible cable-shaped member 20 makes contact with a bending inner peripheral side inner surface 15b in a link frame member 10 in the bending mode. However, since the bending inner peripheral side inner surface 15b of each link frame member 10 in the bending mode forms one arc surface concentric with an arc formed by bending the above-mentioned link frame members mutually, the bending inner peripheral side inner surface 15b forms an arc surface concentric with the bending center of the link frame member 10. Thus a portion of the flexible cable-shaped member 20, positioned at a bent link frame member 10 is smoothly bent along this arc surface so that the flexible cable-shaped member 20 is uniformly brought into contact with the bending inner peripheral side inner surface 15b. Therefore, even if the bending or articulation of the link frame member 10 is repeated, the flexible cable-shaped member 20 is always smoothly bent and not broken. Even if broken, the time to the breakage is considerably longer than in such types of the devices.

Further, in this cable or the like protection and guide device, the link frame members are in the linear mode as mentioned above, the front and rear edges of the outer peripheral side connecting plate 12 in the link frame member 10 and the front and rear edges of the bending inner peripheral side portion 11b of the side plate 11 are in close contact with those of the adjacent link frame members 10. As the link frame members 10 are in the bending mode, the respective link frame members 10 are inclined so that the bending contact surface (region) 14 is moved while changing a position on a bending contact surface of the bending inner peripheral side portion 11b in the adjacent link frame member 10. Then as the link frame members 10 are in the linear mode, the bending contact surface 14 of each link frame member 10 is separated from that of the adjacent link frame member 10. When they were in the linear mode, the bending contact surface 14 of each link frame member 10 is moved in the opposite direction while changing a position on a bending contact surface of the bending inner peripheral side portion 11b in the adjacent link frame member 10. After that the front and rear edges of the outer peripheral side connecting plate 12 in the link frame member 10 and the front and rear edges of the bending outer peripheral side portion 11a of the side plate 11 make contact with those of the adjacent link frame members 10.

In the cable or the like protection and guide device of the present invention the bending contact surface 14 on the front and rear edges of each link frame member 10 is formed of a curved surface of an involute curve. Thus even if each link frame member 10 reaches a bending mode or on the contrary even when it returns from the bending mode to the linear mode, the bending contact surface 14 is moved while changing a position on the bending contact surface of a bending inner peripheral side portion 11b in the adjacent link body 10 without changing a distance to the center of oblique movement of each link frame member 10 whereby the length π R of a radius of the flexible cable-shaped member 20 in link the frame members 10 in the bending mode is not changed and the length of the flexible cable-shaped member 20 is always fixed. Therefore, the tension of the flexible cable-shaped member 20 is not increased, whereby no breakage of the flexible cable-shaped member 20 is generated by the tension. Thus, even if the cable or the like protection and guide device of the present invention is incorporated into an apparatus, which operates at high speed and with high frequency, a cable-shaped member is not broken and a high reliability and endurance can be obtained.

It is noted that, although the cable-shaped member 20 has a form of a cable, a wire or a rope in the above-described example, another form of a strip or the like may be used.

DESCRIPTION OF REFERENCE NUMERALS

10 . . . Link frame member
11 . . . Side plate
11a . . . Bending outer peripheral side portion of side plate
11b . . . Bending inner peripheral side portion of side plate
12 . . . Outer peripheral side connecting plate
13 . . . Inner peripheral side connecting plate
14 . . . Bending contact
15 . . . Guide hole
15a . . . Bending outer peripheral side inner surface of guide hole
15a . . . Bending inner peripheral side inner surface of guide hole
16 . . . Inner space of link frame member
20 . . . Flexible cable-shaped frame member
C . . . Cable or the like
O . . . Bending center of link frame member
R . . . Bending radius While the invention has been described herein by way of example, those skilled in the art will readily recognize that changes may be made to the invention without departing from the spirit and the scope of the appended claims.

What is claimed is:

1. A cable protection and guide device including link frame members; each said link frame member having a rectangular section and side walls; each said side wall includes a guide hole therethrough; a pair of flexible cable-shaped members; one of said flexible cable-shaped members passing through one of said guide holes formed in one of said side walls of said link frame member; the other of said flexible cable-shaped members passing through the other guide hole formed in the other of said side walls of said link frame member; wherein a cable is inserted into said link frame members to be protected and guided in a state where a number of said link frame members are articulately connected to each other by said flexible cable-shaped members characterized in that each of said guide holes being rectangular in cross-section; each of said guide holes includes an arc surface concentric with arc surfaces of guide holes located in adjacent link frame members as the cable protection and guide device curves thus reducing excess wear of said flexible cable-shaped members.

2. The cable or the like protection and guide device according to claim 1, characterized in that each of said arc surfaces of said link frame members is formed of a curved surface consisting of an involute curve.

* * * * *